(12) United States Patent  
Byoun et al.

(10) Patent No.: US 9,564,162 B1  
(45) Date of Patent: Feb. 7, 2017

(54) DATA STORAGE DEVICE MEASURING RESONANT FREQUENCY OF A SHOCK SENSOR BY APPLYING DIFFERENTIAL EXCITATION AND MEASURING OSCILLATION

(71) Applicant: Western Digital Technologies, Inc., Irvine, CA (US)

(72) Inventors: Jaesoo Byoun, Irvine, CA (US); Timothy A. Ferris, Mission Viejo, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/981,785

(22) Filed: Dec. 28, 2015

(51) Int. Cl.
*G11B 7/00* (2006.01)
*G11B 5/596* (2006.01)
*G01H 11/08* (2006.01)
*G01H 13/00* (2006.01)

(52) U.S. Cl.
CPC ........... *G11B 5/59694* (2013.01); *G01H 11/08* (2013.01); *G01H 13/00* (2013.01)

(58) Field of Classification Search
None
See application file for complete search history.

(56) References Cited

U.S. PATENT DOCUMENTS

| | | | |
|---|---|---|---|
| 4,358,742 A | 11/1982 | Ferriss | |
| 5,923,487 A * | 7/1999 | Carlson | G11B 19/04 360/60 |
| 6,011,415 A * | 1/2000 | Hahn | G11B 5/5582 327/103 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |

(Continued)

OTHER PUBLICATIONS

Jaesoo Byoun, et al., U.S. Appl. No. 14/981,844, filed Dec. 28, 2015, 17 pages.

*Primary Examiner* — Peter Vincent Agustin (57) ABSTRACT

A data storage device is disclosed comprising a disk, a head, and a shock sensor comprising a first terminal and a second terminal. A first bias signal is applied signal to the first terminal of the shock sensor and a second bias signal is applied to the second terminal of the shock sensor. An oscillating signal is generated by increasing the first bias signal and decreasing the second bias signal, and a resonant frequency of the shock sensor is detected based on the oscillating signal. A physical shock affecting the head actuated over the disk is detected based on a response of the shock sensor to the physical shock and based on the detected resonant frequency of the shock sensor.

23 Claims, 5 Drawing Sheets

(56) References Cited

U.S. PATENT DOCUMENTS

| | | |
|---|---|---|
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |

(56) References Cited

U.S. PATENT DOCUMENTS

| | | |
|---|---|---|
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,132,459 B2 | 3/2012 | Toga et al. |
| 8,145,934 B1 | 3/2012 | Ferris et al. |
| 8,179,626 B1 | 5/2012 | Ryan et al. |
| 8,184,389 B2 | 5/2012 | Finamore et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,515,135 B2 | 8/2013 | Clarke et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |

(56) References Cited

U.S. PATENT DOCUMENTS

| | | |
|---|---|---|
| 8,824,081 B1 | 9/2014 | Guo et al. |
| 8,824,262 B1 | 9/2014 | Liu et al. |
| 2009/0027798 A1* | 1/2009 | Shu .................. G11B 19/042 360/75 |
| 2010/0035085 A1 | 2/2010 | Jung et al. |
| 2010/0064809 A1* | 3/2010 | Toga .................. G11B 19/042 73/514.34 |
| 2011/0085260 A1* | 4/2011 | Wada ................. G11B 19/042 360/75 |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2014/0063652 A1* | 3/2014 | Otani .................. G11B 33/08 360/97.19 |

* cited by examiner

DATA STORAGE DEVICE MEASURING RESONANT FREQUENCY OF A SHOCK SENSOR BY APPLYING DIFFERENTIAL EXCITATION AND MEASURING OSCILLATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
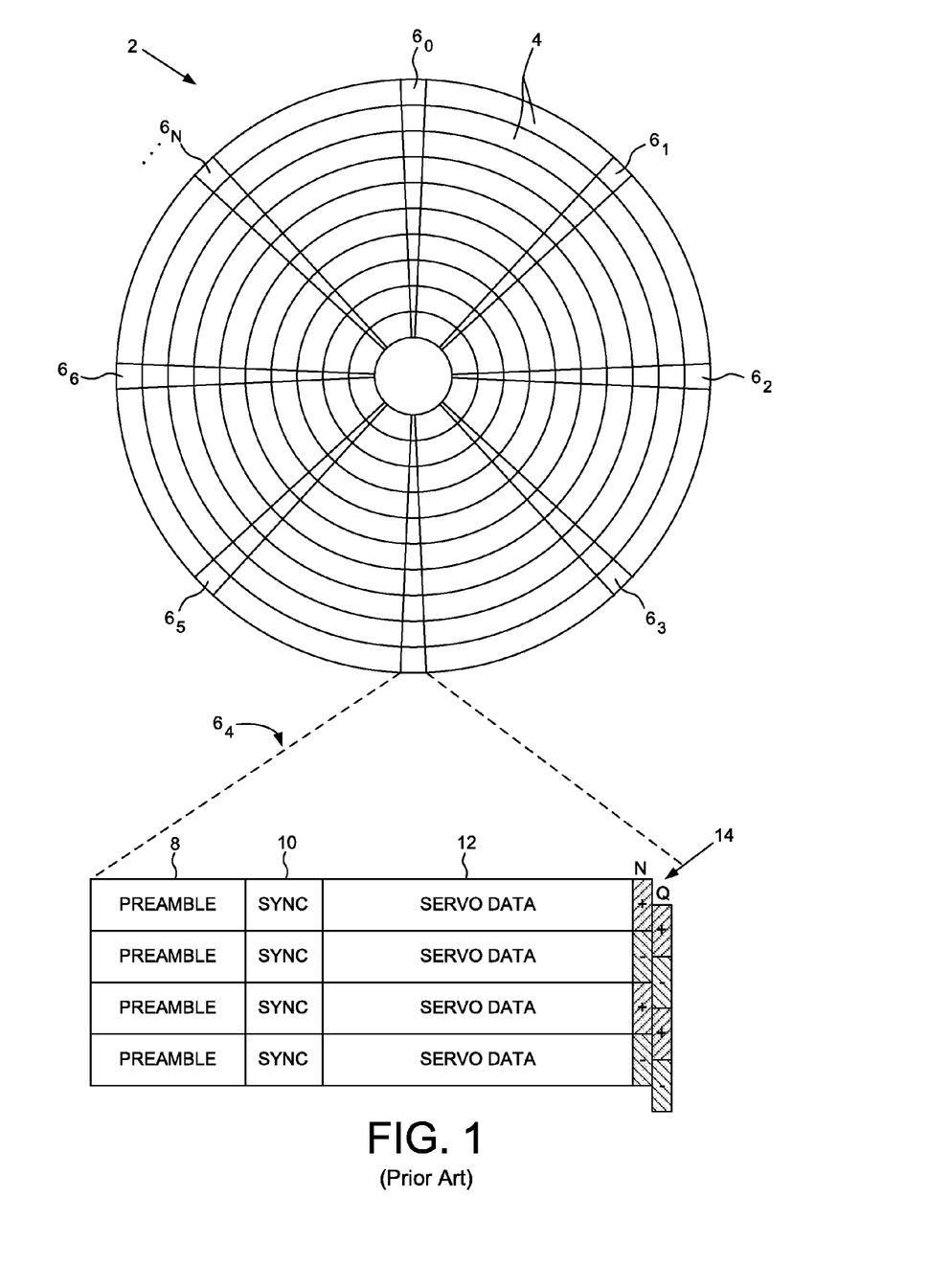
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
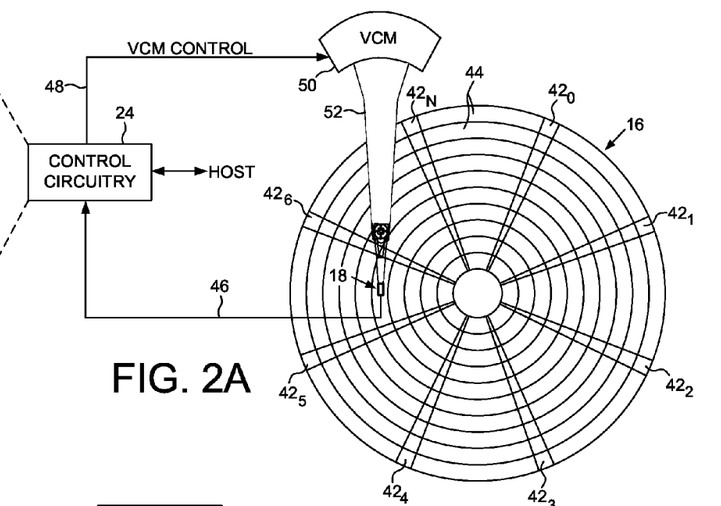
FIG. 2A shows a data storage device in the form of a disk drive according to an embodiment comprising a head actuated over a disk.
Figure 2B:
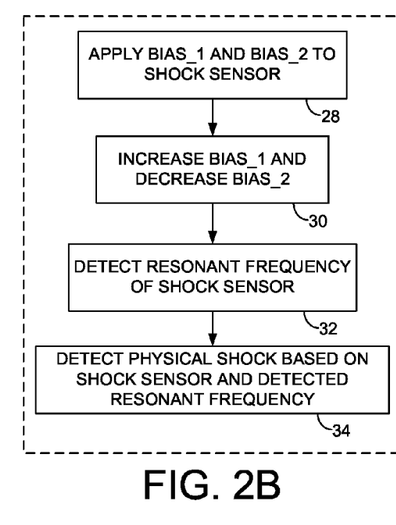
FIG. 2B is a flow diagram according to an embodiment wherein a resonant frequency of a shock sensor is detected by adjusting bias signals applied to both terminals of the shock sensor.
Figure 2C:
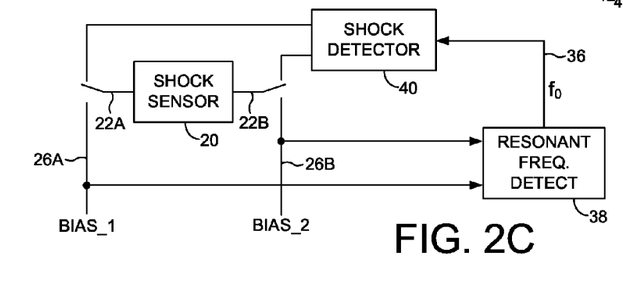
FIG. 2C shows an embodiment wherein the shock sensor is connected to resonant frequency detector when detecting the resonant frequency, and connected to a shock detector when detecting physical shocks affecting the head actuated over the disk.

FIGS. 2A-2C show a data storage device in the form of a disk drive according to an embodiment comprising a disk 16, a head 18, and a shock sensor 20 comprising a first terminal 22A and a second terminal 22B. The disk drive further comprises control circuitry 24 configured to execute the flow diagram of FIG. 2B, wherein a first bias signal 26A is applied signal to the first terminal 22A of the shock sensor 20 and a second bias signal 26B is applied to the second terminal 22B of the shock sensor (block 28). An oscillating signal is generated by increasing the first bias signal and decreasing the second bias signal (block 30), and a resonant frequency 36 of the shock sensor is detected 38 based on the oscillating signal (block 32). A physical shock affecting the head actuated over the disk is detected 40 based on a response of the shock sensor to the physical shock and based on the detected resonant frequency of the shock sensor (block 34).

In the embodiment of FIG. 2A, the disk 16 comprises a plurality of servo sectors $42_0$-$42_N$ that define a plurality of servo tracks 44, wherein data tracks are defined relative to the servo tracks at the same or different radial density. The control circuitry 24 processes a read signal 46 emanating from the head 18 to demodulate the servo sectors $42_0$-$42_N$ and generate a position error signal (PES) representing an error between the actual position of the head and a target position relative to a target track. A servo control system in the control circuitry 24 filters the PES using a suitable compensation filter to generate a control signal 48 applied to a voice coil motor (VCM) 50 which rotates an actuator arm 52 about a pivot in order to actuate the head 18 radially over the disk 16 in a direction that reduces the PES. The servo sectors $42_0$-$42_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

It may be desirable to detect a physical shock affecting the head 18 as it is actuated over the disk 16, for example, in order to abort a write operation or to compensate for the physical shock by adjusting the control signal 48 applied to the VCM 50 (e.g., using feed-forward compensation). Any suitable shock sensor 20 may be employed in the embodiments, such as a suitable piezoelectric sensor. In one embodiment, the shock sensor 20 may exhibit a resonant frequency that effectively distorts the response of the shock sensor 20 to a physical shock. It may therefore be desirable to compensate for the resonant frequency in the shock sensor's output signal, for example, by attenuating the response of the sensor 20 at the resonant frequency (e.g., using a notch filter). Accordingly, in one embodiment the resonant frequency of the shock sensor 20 is detected, and then a physical shock to the disk drive is detected (by a shock detector 40 based on the response of the shock sensor 20 to the physical shock and based on the detected resonant frequency of the shock sensor 20.

Figure 3:
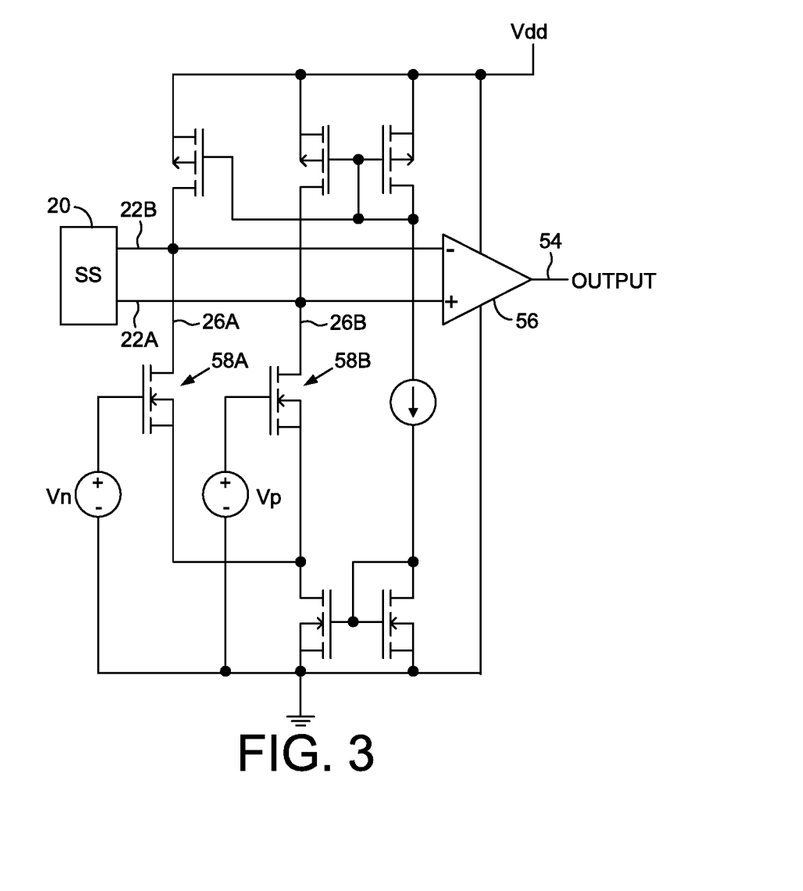
FIG. 3 shows control circuitry configured to generate an oscillating signal representing the resonant frequency of the shock sensor by adjusting bias signals applied to both terminals of the shock sensor.

FIG. 3 shows control circuitry configured to generate an oscillating signal 54 representing the resonant frequency of the shock sensor 20 by adjusting bias voltages 26A and 26B applied to the first and second terminals 22A and 22B of the shock sensor 20. The first and second terminals 22A and 22B are coupled to a differential amplifier 56 operating as a comparator. First and second transistors 58A and 58B operate as a differential pair such that the bias voltages 26A and 26B are proportional to the difference between the gate voltages Vp and Vn. In one embodiment, the gate voltages Vp and Vn are adjusted so as to concurrently increase the first bias voltage 26A and decrease the second bias voltage 26B by the same amount so that the common mode input voltage of the differential amplifier 56 remains substantially constant.

Figure 4:
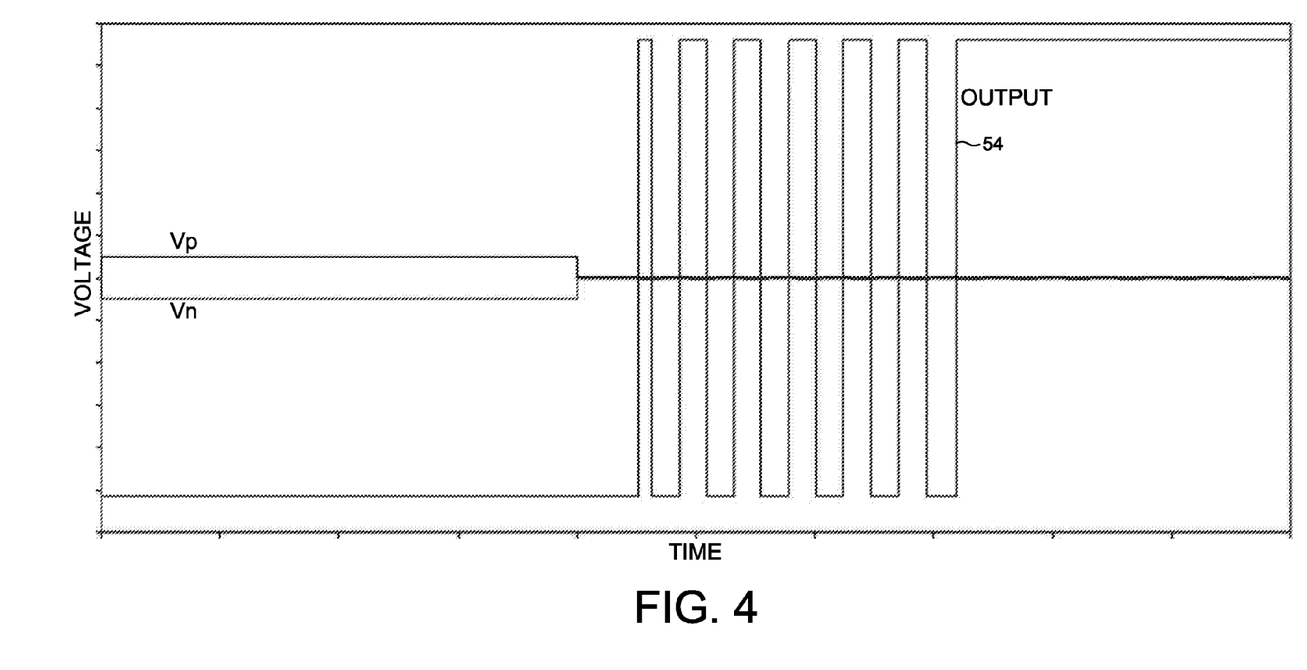
FIG. 4 shows example waveforms generated by the control circuitry of FIG. 3, including an oscillating signal representing the resonant frequency of the shock sensor.

FIG. 4 shows example waveforms generated by the control circuitry of FIG. 3, including an oscillating signal 54 representing the resonant frequency of the shock sensor 20. In this embodiment, the gate voltage Vp is initially higher than the gate voltage Vn such that the bias voltages 26A and 26B are initially in a non-zero state. The gate voltage Vp is decreased and the gate voltage Vn is increased by the same amount so that the bias voltages 26A and 26B transition from the non-zero state to a substantially zero state. The resulting differential excitation of the shock sensor 20 causes the output signal 54 of the differential amplifier 56 to oscillate at the resonant frequency of the shock sensor 20. In another embodiment, the gate voltages Vp and Vn may be initialized to the same amplitude and then increased/decreased by the same amount so that the bias voltages 26A and 26B transition from an initial zero state to a non-zero state.

In one embodiment, the output 54 of the differential amplifier 56 may be processed directly to detect the resonant frequency 36 of the shock sensor 20. In another embodiment, the output 54 of the differential amplifier 56 may be processed (e.g., filtered) such that the oscillating signal that represents the resonant frequency 36 of the shock sensor 20 may be generated based on the output 54 of the differential amplifier 56.

Figure 5:
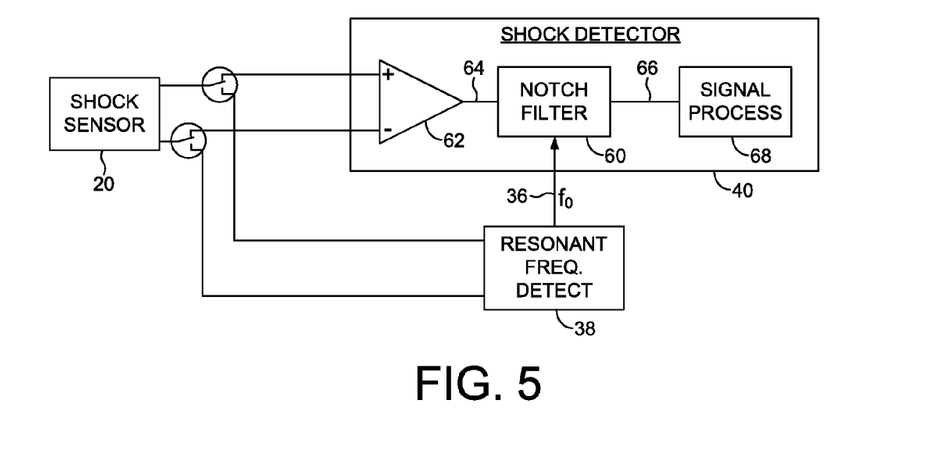
FIG. 5 shows an embodiment wherein the detected resonant frequency of the shock sensor is used to configure a notch filter in the shock detector.

The detected resonant frequency 36 of the shock sensor 20 may be used to configure the shock detector 40 in any suitable manner. FIG. 5 shows an embodiment of a shock detector 40 wherein the resonant frequency 36 detected at block 38 is used to configure the center frequency of a notch filter 60. When the shock sensor 20 is coupled to the shock detector 40, a differential amplifier 62 amplifies the output of the shock sensor 20 to generate an amplified signal 64. The notch filter 60 attenuates the amplified signal 64 at the detected resonant frequency 36 of the shock sensor 20 to generate a compensated signal 66. The compensated signal 66 is further processed at block 68, for example, to evaluate the amplitude, frequency, and/or phase response of the shock sensor 20 to a physical shock affecting the disk drive.

Figure 6:
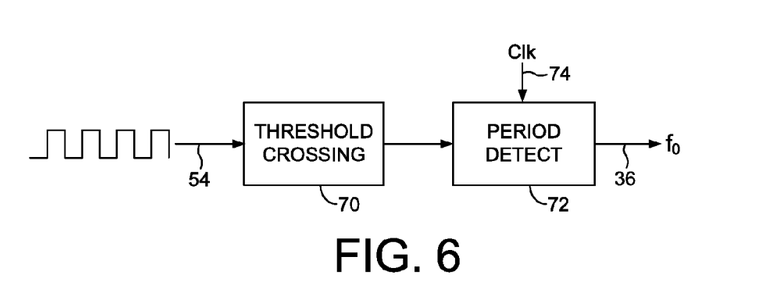
FIG. 6 shows an embodiment wherein the frequency of the oscillating signal is detected based on a period between threshold crossings of the oscillating signal.
Figure 7:
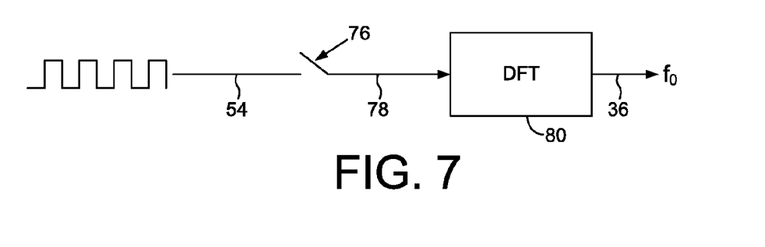
FIG. 7 shows an embodiment wherein the frequency of the oscillating signal is detected by sampling the oscillating signal and computing a discrete Fourier transform.

Any suitable technique may be employed to detect the resonant frequency 36 of the shock sensor 20 based on the oscillating signal generated, for example, by the control circuitry of FIG. 3. FIG. 6 shows an embodiment wherein the oscillating signal 54 is processed by a threshold crossing detector 70. A period detect circuit 72 measures a period between the threshold crossings (relative to a clock 74) in order to measure the period of the oscillating signal 54 (the resonant frequency 36 being the inverse of the period of the oscillating signal 54). In another embodiment shown in FIG. 7, the oscillating signal 54 may be sampled 76 and the resulting signal samples 78 processed at block 80 to compute a discrete Fourier transform of the oscillating signal 54 (or other suitable digital signal processing). In yet other embodiments, the oscillating signal 54 may be processed (in continuous or discrete time) using a suitable detection filter (e.g., notch or bandpass) having an adjustable center frequency. The center frequency of the detection filter may be adjusted until it matches the frequency of the oscillating signal 54 (as indicated by the output of the detection filter).

In one embodiment, the resonant frequency of the shock sensor 20 may vary over time due, for example, to general degradation of the shock sensor and/or due to a change in an environmental condition, such as a change in temperature or pressure. Accordingly, in one embodiment the shock sensor 20 may be reconnected to the resonant frequency detector 38 in order to update the detected resonant frequency 36 of the shock sensor 20, as well as update operation of the shock detector 40. In yet another embodiment, the shock sensor 20 may be connected to both the resonant frequency detector 38 and the shock detector 40 such that the detected resonant frequency 36 may be updated continuously over time.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head;
   a shock sensor comprising a first terminal and a second terminal; and
   control circuitry configured to:
      apply a first bias signal to the first terminal of the shock sensor and apply a second bias signal to the second terminal of the shock sensor;
      generate an oscillating signal by increasing the first bias signal and decreasing the second bias signal;
      detect a resonant frequency of the shock sensor based on the oscillating signal; and
      detect a physical shock affecting the head actuated over the disk based on a response of the shock sensor to the physical shock and based on the detected resonant frequency of the shock sensor.

2. The data storage device as recited in claim 1, wherein the shock sensor is a piezoelectric sensor.

3. The data storage device as recited in claim 1, wherein the first bias signal is increased and the second bias signal is decreased by substantially the same amount.

4. The data storage device as recited in claim 3, wherein after increasing the first bias signal and decreasing the second bias signal, an amplitude of the first bias signal substantially matches an amplitude of the second bias signal.

5. The data storage device as recited in claim 3, wherein before increasing the first bias signal and decreasing the second bias signal, an amplitude of the first bias signal substantially matches an amplitude of the second bias signal.

6. The data storage device as recited in claim 1, wherein:
   the control circuitry comprises a differential amplifier comprising a first input coupled to the first terminal of the shock sensor and a second input coupled to the second terminal of the shock sensor; and
   the first bias signal is increased and the second bias signal is decreased by substantially the same amount so that a common mode input voltage of the differential amplifier remains substantially constant.

7. The data storage device as recited in claim 6, wherein the differential amplifier outputs the oscillating signal.

8. The data storage device as recited in claim 6, wherein the oscillating signal is generated based on an output of the differential amplifier.

9. The data storage device as recited in claim 1, wherein the first bias signal is a voltage and the second bias signal is a voltage.

10. Control circuitry for use in a data storage device comprising a head actuated over a disk, the control circuitry configured to:
    apply a first bias signal to a first terminal of a shock sensor and apply a second bias signal to a second terminal of the shock sensor; and
    generate an oscillating signal representing a resonant frequency of the shock sensor by increasing the first bias signal and decreasing the second bias signal,
    wherein:
       the control circuitry comprises a differential amplifier comprising a first input for coupling to the first terminal of the shock sensor and a second input for coupling to the second terminal of the shock sensor; and
       the first bias signal is increased and the second bias signal is decreased by substantially the same amount so that a common mode input voltage of the differential amplifier remains substantially constant.

11. The control circuitry as recited in claim 10, wherein the shock sensor is a piezoelectric sensor.

12. The control circuitry as recited in claim 10, wherein the first bias signal is increased and the second bias signal is decreased by substantially the same amount.

13. The control circuitry as recited in claim 12, wherein after increasing the first bias signal and decreasing the second bias signal, an amplitude of the first bias signal substantially matches an amplitude of the second bias signal.

14. The control circuitry as recited in claim 12, wherein before increasing the first bias signal and decreasing the second bias signal, an amplitude of the first bias signal substantially matches an amplitude of the second bias signal.

15. The control circuitry as recited in claim 10, wherein the differential amplifier outputs the oscillating signal.

16. The control circuitry as recited in claim 10, wherein the oscillating signal is generated based on an output of the differential amplifier.

17. The control circuitry as recited in claim 10, wherein the first bias signal is a voltage and the second bias signal is a voltage.

18. A method of operating data storage device comprising, the method comprising:
    applying a first bias signal to a first terminal of a shock sensor and applying a second bias signal to a second terminal of the shock sensor;
    generating an oscillating signal by increasing the first bias signal and decreasing the second bias signal;
    detecting a resonant frequency of the shock sensor based on the oscillating signal; and
    detecting a physical shock affecting a head actuated over a disk based on a response of the shock sensor to the physical shock and based on the detected resonant frequency of the shock sensor.

19. The method as recited in claim 18, wherein the shock sensor is a piezoelectric sensor.

20. The method as recited in claim 18, wherein the first bias signal is increased and the second bias signal is decreased by substantially the same amount.

21. The method as recited in claim 20, wherein after increasing the first bias signal and decreasing the second bias signal, an amplitude of the first bias signal substantially matches an amplitude of the second bias signal.

22. The method as recited in claim 20, wherein before increasing the first bias signal and decreasing the second bias signal, an amplitude of the first bias signal substantially matches an amplitude of the second bias signal.

23. The method as recited in claim 18, wherein the first bias signal is a voltage and the second bias signal is a voltage.

\* \* \* \* \*